Aug. 19, 1958     A. G. SCHILBERG     2,848,075
TERMINAL EXTENSION FOR UNIT BRAKE BEAM
Filed Oct. 19, 1955
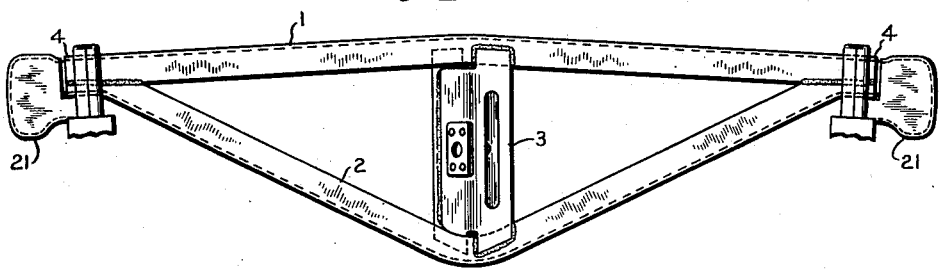
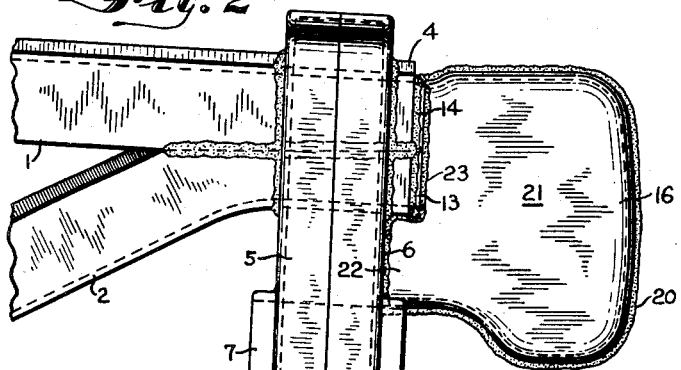
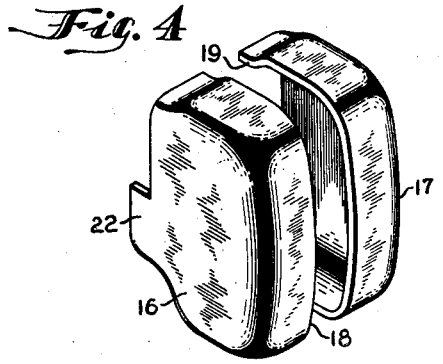
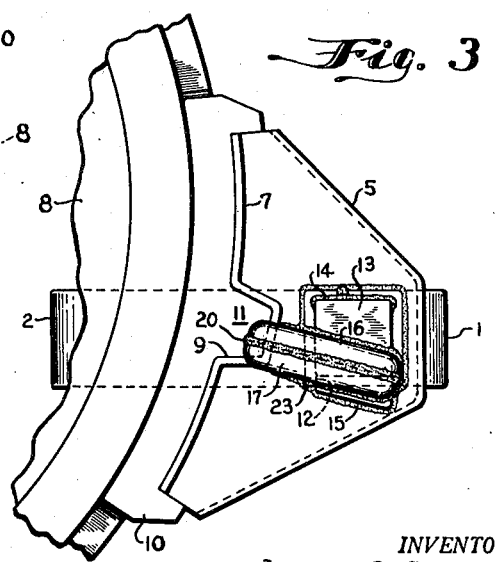
INVENTOR.
ARNOLD G. SCHILBERG
BY
Andrus & Sceales
Attorneys

2,848,075

TERMINAL EXTENSION FOR UNIT BRAKE BEAM

Arnold G. Schilberg, Milwaukee, Wis., assignor to A. O. Smith Corporation, Milwaukee, Wis., a corporation of New York Application October 19, 1955, Serial No. 541,345

2 Claims. (Cl. 188—233.3)

This invention relates to a unit brake beam for a railway car and more particularly to the terminal supporting means for the brake beam.

Generally, a unit brake beam includes a tension member and a compression member which are spaced from each other centrally of their length and joined by a strut. The members are bent to a predetermined camber to bring the respective ends together for welding to form a truss structure. A brake head is carried on each end of the beam and is adapted to carry a brake shoe for engaging the car wheel associated therewith to brake the wheel. To guide the beam in movement toward and away from the wheel a terminal extension is provided on the respective ends of the beam and serves to slidably support the beam within guides carried by the car truck frame to permit relative braking movement between the beam and the car wheels.

According to the invention, the terminal extension provided on each end of the brake beam for supporting the beam within the car truck frame guides is comprised of an upper and a lower half member. The half members are provided with opposed flanges along the forward, outward and rearward contours of the members and are welded together at the meeting flange edges to form a hollow clam-like weldment. The rearward portion of the inner edge of the weldment is adapted to seat against the end of the brake beam and is secured thereto by welding. The half members forming the weldment project inwardly at a position forward of the beam end to place the forward portion of the inner edge of the weldment in contact with the outer side wall of the brake head. A weld secures the extension weldment to the brake head. This construction provides a lightweight terminal extension having strength characteristics commensurate with service intended.

The drawings furnished herewith illustrate the best mode of carrying out the invention as presently contemplated and set forth hereinafter.

In the drawings:

Figure 1 is a top plan view of a unit type brake beam;

Fig. 2 is an enlarged fragmentary view showing the attachment of the terminal extension of this invention at the end of the beam;

Fig. 3 is an end elevation of the brake beam showing the terminal extension; and Fig. 4 is a perspective view showing the separate opposed halves from which the terminal extensions are fabricated in accordance with the invention.

Referring to the drawing, the truss-type railway brake beam shown in Figure 1 is comprised of a channel-section compression member 1 and a channel-section tension member 2 disposed forwardly of the compression member. The members 1 and 2 are disposed in flange facing relation and are interconnected centrally of their length by a strut 3 which serves to support actuating mechanism, not shown, for moving the brake beam into and out of braking engagement with the associated railway car wheels.

The channel-section members 1 and 2 are bent to proper camber so that the members converge at the ends of the beam and the opposed flanges are joined together by welding over a substantial distance to provide an elongated box-section beam end portion 4.

In view of the symmetry of a brake beam, the description hereinafter will be confined to one end of the beam, it being understood that the other end is constructed in like manner.

A brake head 5 is secured on the box-section beam end portion 4 and has its outer wall 6 spaced inwardly a short distance from the end of the beam. A shoe plate 7 is secured to head 5 and extends forwardly of the head in a direction toward the wheel 8. The outer side wall of the shoe plate 7 extends outwardly beyond the outer wall 6 of the brake head. The shoe plate 7 is provided with a lug engaging recess 9 which is disposed substantially centrally of the upper and lower reaches of the head 5 and in substantially horizontal alignment with the beam end portion 4. A brake shoe 10 having a lug 11 for engaging recess 9 is disposed against the forward face of shoe plate 7 and is secured thereto. In service the beam is actuated forwardly toward the car wheel 8 to place the shoe 10 into engagement with the wheel to brake or stop the car truck.

As shown in Fig. 3, the lower surface of the box-section beam end portion 4 is recessed at 12 so that the lower surface terminates flush with the outer wall 6 of the brake head 5. An end closure plate 13 is disposed within the end of the beam and is secured to the upper surface of the box-section end portion 4 by weld 14. The closure plate 13 extends downwardly through recess 12 to enclose the end of the beam and increase the torsional rigidity of the box-section end portion 4 and the lower edge of the closure plate is secured to the outer wall 6 of brake head 5 by weld 15.

The end or terminal supporting means of the invention is comprised of an upper member 16 and an opposed lower member 17. The members 16 and 17 are cold formed to provide opposed flanges 18 and 19 respectively, which extend along the forward, outward, and rearward sides of the members. The flanges 18 and 19 are secured together by weld 20 to form a hollow clam-like terminal extension 21 which is open on the inward side.

The rearward portion of the inner edge of the terminal extension 21 is adapted to seat against the end plate 13 enclosing the beam end portion 4. Forwardly of the beam end portion 4, the members 16 and 17 extend inwardly to provide the terminal extension 21 with a projection 22 which engages the outer wall 6 of brake head 5 and extends substantially between the beam end portion and recess 9 in the shoe plate 7. A weld 23 extends around the inner edge of the extension 21 and secures the extension to the end plate 13, to the end of the beam, to the outer wall 6 of the brake head 5, and to the shoe plate 7 at the recess 9, respectively.

In service, the hollow clam-like extension 21 is disposed in a guide, not shown, and is adapted to slide forwardly toward the wheel 8 as the brake beam is actuated to carry the brake shoe 10 into engagement with the wheel to brake the car truck. The sliding terminal extension 21 carries a considerable load so that it must be fabricated from materials having suitable wear and strength characteristics. While other materials may be satisfactory for this purpose it has been found that steel in the range of S. A. E. 950 is particularly adaptable for this use. This material has the added advantage of high ductility so that the flanged members 16 and 17 may be cold formed in a single operation. The hollow welded structure of the invention provides a sturdy, lightweight terminal extension which further reduces the overall weight of the brake beam.

Various modes of carrying out the invention are contemplated as being within the scope of the following claims particularly pointing out and distinctly claiming the subject matter which is regarded as the invention.

I claim:

1. In a unit brake beam for use in a railway car truck and having a compression member and a tension member disposed forwardly of the compression member with the ends of the members being integrally secured together to provide a beam end portion, brake head means integrally secured on the end portion of the beam and adapted to engage the car wheel when the beam is actuated forwardly toward the car wheel, a terminal extension adapted to slide within guide means provided on the car truck and comprising a pair of wear elements having opposed forward, rearward and outer edge flanges, each of said elements having a portion of their inner edge seating against the end of the beam and having another portion of their inner edge projecting inwardly and seating against the outer wall of the brake head means forwardly of the beam end portion, and welds joining the opposed flanges of the wear elements to form an integral hollow extension and joining the extension to the end of the beam and to the brake head means respectively.

2. In a unit brake beam for use in a railway car truck, a channel-section compression member, a channel-section tension member disposed forwardly of the compression member, said members being disposed in flange facing relation and converging at their ends to place the opposed flanges in abutting relation, welds joining the abutting flanges of said members over a substantial distance extending outwardly from the inner juncture of said members to form a trussed beam having a generally box-section end portion, and end closure plate disposed within and being integrally secured to the end of the beam to close off the end of the beam and increase the torsional rigidity of the box-section end portion, brake head means secured on the box-section end portion of the beam inwardly from the end plate, a terminal extension adapted to slide within guide means provided on the car truck and consisting of a pair of wear elements having opposed forward, rearward and outer edge flanges, each of said elements having a portion of their inner edge seating against the end closure plate and having another portion of their inner edge projecting inwardly and seating against the outer wall of the brake head means forwardly of the beam end portion, and welds joining the opposed flanges of the wear elements to form an integral hollow extension and joining the inner edges of the wear elements to the end closure plate and the end of the beam and to the brake head means respectively.

References Cited in the file of this patent

UNITED STATES PATENTS

| | | |
|---|---|---|
| 2,519,896 | Ekholm | Aug. 22, 1950 |
| 2,524,740 | Tack | Oct. 3, 1950 |
| 2,702,614 | Spaeth | Feb. 22, 1955 |
| 2,755,892 | Sherman | July 24, 1956 |